United States Patent [19]
Zimmer

[11] Patent Number: 4,944,445
[45] Date of Patent: Jul. 31, 1990

[54] METHOD FOR AUTOMATIC JOINING AND MACHINING

[75] Inventor: Ernst Zimmer, Friedberg, Fed. Rep. of Germany

[73] Assignee: Kuka Schweissanlagen & Roboter GmbH, Augsburg, Fed. Rep. of Germany

[21] Appl. No.: 422,582

[22] Filed: Oct. 17, 1989

Related U.S. Application Data

[64] Division of Ser. No. 925,000, Oct. 22, 1986, Pat. No. 4,893,398.

[30] Foreign Application Priority Data

Feb. 22, 1985 [DE] Fed. Rep. of Germany ....... 3506314

[51] Int. Cl.$^5$ ............................................. B23K 37/02
[52] U.S. Cl. ..................................... 228/102; 219/79; 228/47
[58] Field of Search ................... 228/102, 178, 4.1, 47; 219/79, 80

[56] References Cited

U.S. PATENT DOCUMENTS

| | | | |
|---|---|---|---|
| 3,288,978 | 11/1966 | Trygar | 219/80 |
| 4,256,947 | 3/1981 | De Candia | 219/79 |
| 4,535,927 | 8/1985 | Matsubara | 228/6.1 |
| 4,682,722 | 7/1987 | Bossotto et al. | 228/4.1 |

Primary Examiner—Kenneth J. Ramsey
Attorney, Agent, or Firm—McGlew & Tuttle

[57] ABSTRACT

The invention relates to a method and a device for automatically joining and matching assemblies consisting of several components each and retained on a workpiece carrier (4) in a transfer line with retoolable machining stations (3). In the machining station (3), the assembly components are first taken off the workpiece carrier, brought into the joining position relative to each other, retained there and machined, in particular tacked or finish-welded. To carry out these various activities and to make the machining station highly flexible, the latter has several tool carriers (22, 23) which can move in at least three axes. The tool carriers (22, 23) are each disposed in a parallel plane above or below the workpiece carrier (4) so they can travel freely. The tool carriers (22, 23) support individual tools which they can change automatically at stationary or movable tool magazines (31, 33, 34). In conjunction with freely programmable actuators for the independent motion of the individual tool carriers (22, 23), new sets of tools can be put together in mosaic fashion for the various activities and in the event of an assembly type change-over.

2 Claims, 8 Drawing Sheets

FIG. I

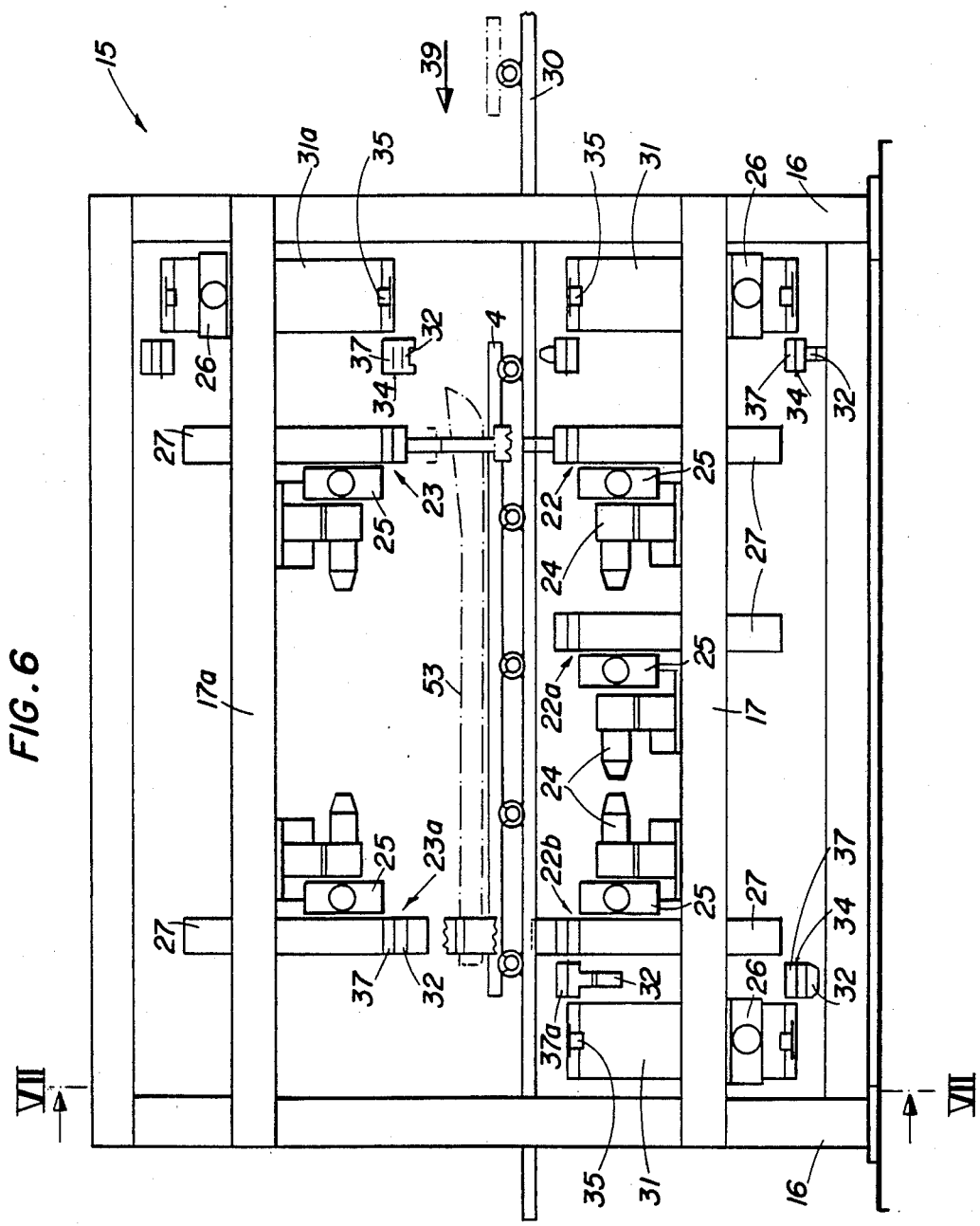

METHOD FOR AUTOMATIC JOINING AND MACHINING

This is a divisional application Ser. No. 925,000 filed Oct. 22, 1986, now U.S. Pat. No. 4,893,398.

BACKGROUND OF THE INVENTION

Field of the Invention

The invention relates in general to automatic manufacturing and in particular to a new and useful method and a device for automatically joining and machining assemblies and components thereof.

It is known from DE-OS No. 28 10 822 to preposition, in a first station of a transfer line for automobile body welding, several sheet metal elements forming a subassembly on a pallet and to clamp them preliminarily in this conjugate position. The pallet with the loosely assembled body assembly then arrives in a fixing station which, in addition to welding robots, also has side frames with chucking devices engaging the various body parts to fix their final geometry. The body parts are subsequently tacked in this position by spot welding. From this so called fixing station the pallet with the tacked body assembly gets to a next machining station in which the body is finish-welded, using appropriate centering and chucking means.

In order to be able to process in such a transfer line different subassemblies, e.g. to a 2-door to a 4-door body type of a vehicle, several side frames with permanently set-up chucking devices fitting the respective body type are provided in the fixing station In the simple case, there are provided in the fixing station itself two different kinds of side frames which can be put into waiting positions when not being used. But is also possible to have a greater number of side frames in readiness via a conveyor and a storage facility and feed them in when needed. This publication further provides for making one side frame suitable for two similar types of body assemblies in that the chucking devices for both types are mounted to the side frame and the chucking devices needed for the respective type are then actuated selectively.

Freely programmable welding robots are provided for the welding operations which can be programmed by software to the various assembly types.

On the one hand, the known transfer line has the disadvantage of a relatively poor operating reliability due to the series arrangement of the various work stations. If one station in the line fails, all other succeeding station are also stopped.

On the other hand, the hardware sophistication for the flexibility of the transfer line is great. A separate set of side frames with their own chucking devices is required for each body type. Due to the fixing station for tacking, and the machining station for finish welding, being separated from each other, the costs for chucking devices is doubled. In addition, in the simple embodiment, the fixing station is flexible to a limited degree only. If the flexibility is to be improved, a space and cost intensive conveyor and a storage facility are required.

SUMMARY OF THE INVENTION

Therefore, it is an object of the present invention to make a transfer line operationally more reliable and to achieve by simpler means a greater flexibility of the transfer line.

Contrary to the state of the art, in which the assembly, already put together and tacked, was merely finish-welded in the machining station, the method according to the invention provides that the functions of the two preceding stations, namely the setup and the fixing stations, are performed in the machining station also. Accordingly, in the storage facility, the individual parts of the subassembly are merely placed loosely on a work piece carrier, generally a pallet, and brought to the machining station in unjoined condition. There, the precommissioned assembly parts are brought into the proper position relative to each other and welded. Depending on the application, the assembly parts can be finish welded immediately without preceding tacking. However, they may also be tacked first then welded.

The invention offers the advantage that, by unifying three stations into one, the hardware costs and the floor space requirements are reduced. In addition, one operation, the tacking, can be saved. If, for reasons of high throughput, several machining stations according to the invention must be present in a transfer line, they may also be mutually paralleled so that the throughput of the transfer line is impaired only relatively slightly if one machining station fails.

The method according to the invention is based on the fundamental idea of assembling in mosaic fashion a completely new set of tools when there is a change in the assembly type to be machined. This is done by exchanging the individual tools in the machining station. This requires considerably less expense than in the state of the art because it is only the individual tools, i.e. the chucks, grippers, welding tongs, etc. which must be kept in stock, and not a complete set of tools individually assembled for each assembly type. For, single tools ar also suited for different assembly types and then need be present only once, according to the invention.

The method according to the invention and the device for its execution allows virtually unlimited flexibility of the machining station and also of the entire transfer line at relatively low cost. The flexibility is now essentially only a question of software and no longer of hardware.

The method according to the invention and the associated device are primarily suited for welding transfer lines. The basic inventive idea of carrying out the joining and machining operations in one station, however, may also find applications in other field, e.g. in assembly lines or in complex machining lines where the machining operations also comprise forming operations with and without chip removal, in addition to welding. Additionally, the inventive idea is not restricted to transfer lines, but can also be used in single stations.

The device and machining station according to the invention can also operate in accordance with the state of the art in that assemblies already joined and tacked are merely finish-machined. In so doing, already joined, tacked and otherwise premachined assembly parts, so called subgroups, can be fed to the machining station together with other loosely precommissioned parts.

The machining station according to the invention contains several tool carriers which are singly movable in three dimensions and whose tools can approach any point of the subassembly. The tool carriers may carry different tools, e.g. grippers or chucks which, themselves, may be designed as individual tools or tools of a set. In addition, welding tongs, chip removing cutting tools,assembly tools like screwdrivers or the like or any other type of tool may be provided as tools. The tools themselves may also have other, additional shafts with appropriate drives.

The tool carriers are freely movable in space. According to the embodiment examples, shown, the tool carriers have three translatory degrees of freedom for this purpose. But in order embodiments they may also have more degrees of freedom or also two translatory and one rotary ones. The number and kind of the degrees of freedom depends primarily on the requirements inherent in the workpiece, i.e. the assembly.

The tool carriers are controllable individually, and their tools can reach any point of the assembly. The motion of the tool carriers and the function of their tools are controlled by an appropriate program. Mutual collision of the tool carriers is prevented by direct or by overriding control measures. When there is a changeover to another assembly to be machined, the control program is exchanged. In many cases, the tools of the tool carriers will then be changed also. But is also possible to use universal tools suited to handle and machine different assemblies. This then requires only a control program change, which means very low cost, associated only with the software.

The tool carriers may be combined into groups and mounted in one or several planes. Within their group they possess, now as before, the same free mobility in space. Only, within the group that tool carriers move in the same plane, i.e. they have two identical axes. As to the third and possibly additional axes, the tool carriers may differ individually.

In the embodiment examples shown, two or three planes of motion are provided for the tool carriers. In other embodiment examples, more or fewer planes may be present. It is recommended to arrange at least one plan of motion of the tool carriers parallel to the workpiece carrier plan, especially to the plan of a pallet. In variation of the embodiment examples, the workpiece carrier may also be moved in a vertical or oblique plane, in accordance with which at least one tool carrier plan is also aligned vertically or obliquely.

The embodiment example in which the tool carriers can travel in two parallel planes above and below the workpiece carrier makes a very high degree of flexibility possible already because every point of the assembly is accessible by appropriate tools from the top, from the bottom and from the sides. For special handling tasks such as turning or erecting individual parts of the assembly, a third or even a fourth vertical plan of motion may be provided according to another embodiment example.

According to the embodiment examples, the tool carriers travel over a crossbeam like the trolleys of a crane, and the crossbeam in turn moves back and forth on two longitudinal beams.

In variation thereof it is also possible to equip the tool carriers with a steerable running gear, for instance, and to move them on the floor of the machining station independent of each other.

According to the embodiment examples it is recommendable to mount to each crossbeam at least two tool carriers of opposite sides. They can then travel along the crossbeam without hindering each other. But additional tool carriers may also be mounted to a crossbeam.

Likewise, one or more crossbeams may be provided in the various planes of motion.

To be able to position the tool carriers with their tools exactly, it is recommendable to use for the drives of the three axes of motion precise actuators, preferably in the form of step motors or pancake drives, in conjunction with no-backlash toothed belt or rack drives.

It should be possible to couple the tool carriers to all tools. To make this possible, standard couplings are provided, having connections for the tool operating means like power, coolant, compressed air, hydraulic fluid, etc. Also, control signals and energy for additional drives in the tools must be transmitted through the couplings. Depending on their kind, the operating means are supplied to the tool carriers via drag lines, wiper contracts, etc. Therefore, connectors for all operating means used in the machining station are present on the coupling of each tool carrier. On the tool coupling, however, only the connectors for the various operating means needed by the tool are provided. All couplings are designed as plug-in couplings with self-locking connectors for liquid and gaseous media, opening only when connected to the connector counterpart. This way, the connections for operating means not needed remain closed on the tool carrier coupling. To connect the two coupling parts of the tool and the tool carrier, they have a threaded bayonet arrangement which is caused to rotate by the tool carrier. Consequently, the tool carriers can fetch and release the tools again automatically.

The two-part coupling on the tool carrier has between its external part and its internal part rotatably mounted therein an unlockable locking mechanism which can be disengaged in order to rotate the threaded bayonet arrangement and which, on the other hand, transmits the torsional forces occurring during the operation of the tool. For low torsions a spring-loaded ball detent suffices. For greater forces, at least one controlled locking bolt is provided for a form-closing connection under full load. However, a combination of both locking means is possible also.

The tool carrier may have one or more couplings disposed on the carrier head of appropriate size. Thus, a tool carrier may be equipped with several different tools which work together or some of which are kept in readiness in order to save tool change times. Additionally, a multiple-piece tool set may thus be used which, due to its division and the separate disposition of its individual parts requires less space in the tool storage.

To store the tools which happen not to be in use, the machining station has one or more tool storage magazines. Preferably, one or two tool magazines are assigned to each group of tool carriers moving in a common plane. In the simplest case, the tool magazines are stationary and consist merely of a number of tool seats to which the tool carriers travel to deposit or fetch their tools.

To accelerate the tool change and shorten the setup time, movable tool magazines may be provided which move relative to the tool carriers. Thus, the tool magazine is positioned opposite the tool carrier to be equipped, and in the tool magazine carrying the tool needed just then is moved into the transfer position.

In addition to the embodiment examples shown, other tool magazine variations are possible in that, for example, tool magazines movable in several axes or else stationarily mounted tool magazines movable in themselves are provided, such as revolver magazines, etc.

Magazines of the above described kind may also be provided to feed in needed hardware such as for screwdrivers.

According to the invention, pallets with bearing arms on which the individual parts of the assemblies are deposited next to each other are used as workpiece carriers. In order to hold these parts securely when transporting the pallet, and still be able to remove and transport them with the tool carriers without much energy consumption it is recommendable to provide snap connections between the bearing arms and the individual parts of the assembly But it is also possible to deposit individual assembly parts loosely on top of each other. The parts may then assume their joining position.

The machining station according to the invention permits the low-cost use of simple pallets with relatively inaccurate single seats for the assembly components. The components are put into the accurate machining position by the tool carriers with correspondingly accurate centering and chucking tools.

In order to prevent an impairment of the tool carrier functions during the handling, chucking and machining operations taking place simultaneously it is recommendable to deposit the assembly components in the peripheral area of the pallet, thus keeping the inside area of the pallet free for the above mentioned operations. The bearing arms will then not interfere with the tool carriers in their motions.

In its configuration shown, the machining station according to the invention is in a position to have its tool carriers perform all handling, chucking and machining operations. But for special tasks it is also possible to provide complementarily industrial robots which intervene in the machining station from the outside, performing additional handling, chucking and feeding tasks.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS.

In the drawings:

FIG. 6, is a side view of a machining station of another embodiment and variation of FIG. 3;

GENERAL DESCRIPTION OF THE PREFERRED EMBODIMENTS

Figure 1:
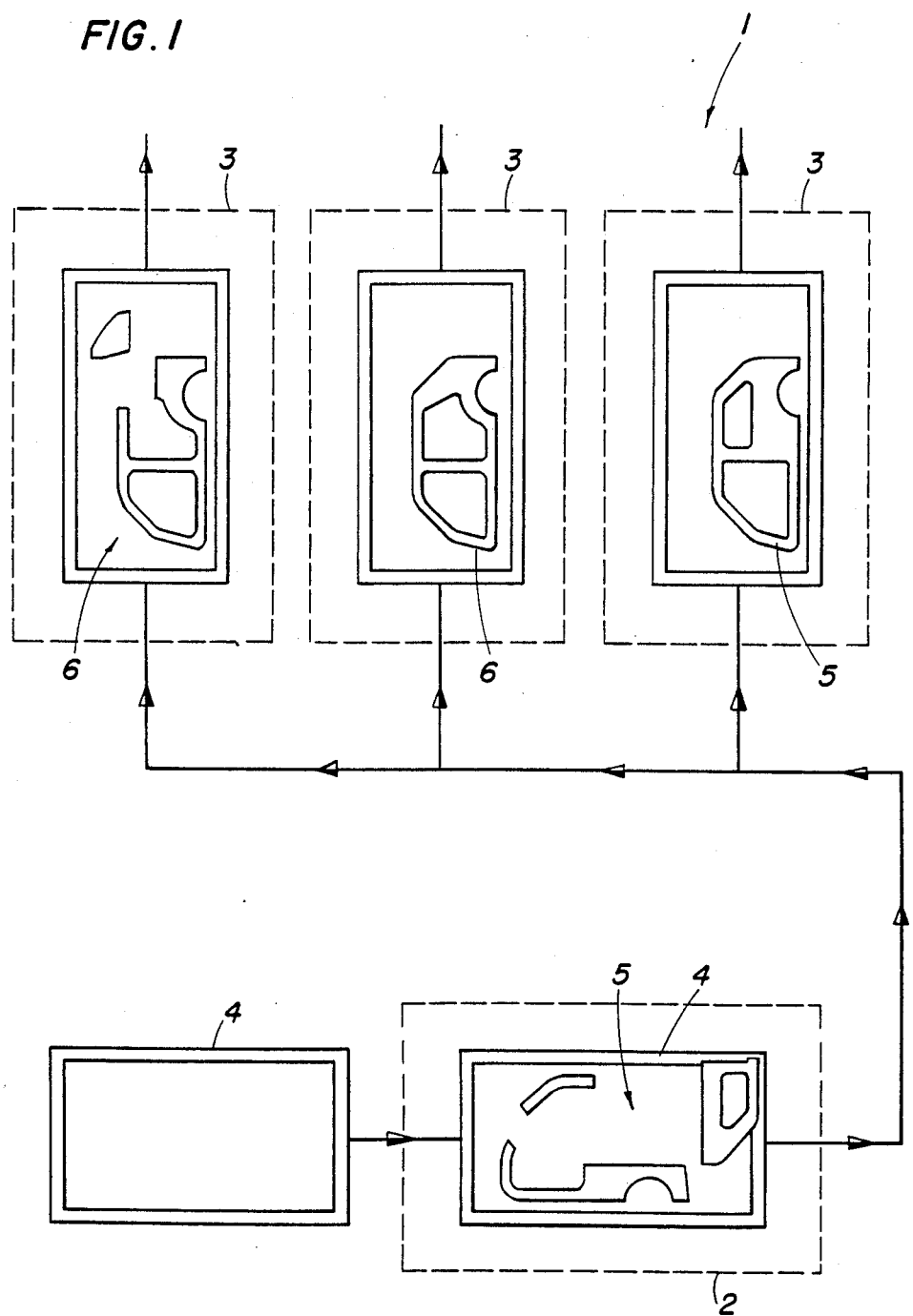
FIG. 1, is a schematic plan view of a transfer line with three machining stations.

Shown in part and schematically in FIG. 1 is a transfer line 1 for the manufacture of vehicle bodies. Empty workpiece carriers 4, hereinafter called pallets are brought into a setup station 2 of a storage facility. The individual components of the assemblies 5,6 to be welded are deposited loosely, and next to each other on the pallet 4 in the setup station. In this case, according to FIGS. 2 and 5, the assemblies 5, 6 represent the sidewalls of a vehicle body. In the embodiment example shown, two different assembly types 5, 6 are processed in a free mix in the transfer line 1. The assembly 5 represents the two-door sidewall and the assembly 6 the four-door sidewall of the same vehicle type. In variation thereof, however, the assemblies of completely different vehicle types can be processed in the same transfer line 1. The transfer line 1 is of unlimited flexibility regarding the number and different designs of the various assemblies.

From the setup station 2, the pallets 4 are brought to one of the three paralleled, juxtaposed machining stations 3. In the machining station 3, the assembly components are removed from their seats on the pallet and are brought and held in a joining position relative to each other. Then the assembly parts are centered and chucked in the final position relative to each other and welded or otherwise machined. The finished assemblies are then transported out of the machining stations 3 on their pallets 4 and newly assembled to other body parts on new pallets, or else temporarily stored and treated otherwise.

In the two right-hand machining stations 3, FIG. 1 shows pallets 4 with different assemblies 5 and 6 in an already finish-welded state. In the left machining station 3, an assembly 6 is only partly finished.

Figure 2:
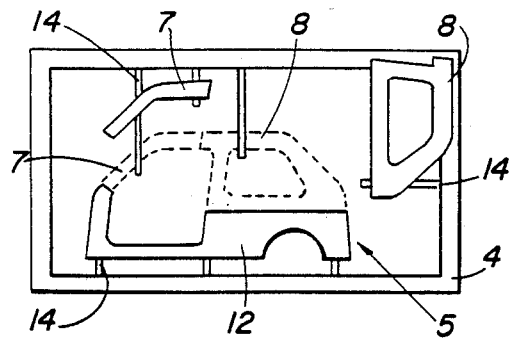
FIG. 2, is a workpiece carrier with an assembly of several individual parts.

FIG. 2 shows a pallet 4 with an assembly 5 in the form of a two-door sidewall. The assembly 5 includes several components to be welded to each other. They involve a front roof spar 7, a rear roof spar 8 and a bottom part 12 of a two-door sidewall of a motor vehicle. The position of the components after finish-welding is shown in broken lines in FIG. 2.

The pallet 4 has a closed frame, from which project into the free interior bearing arms 14 on which the components 7, 8, 12 are deposited and held. To be welded to the bottom part 12, the roof spars 7, 8 must be removed from their seating position next to the bottom part 12 and conjuqated to the latter. To make this removal easy, the roof spars 7, 8 are detachably held on the bearing arms 14 by snap connections. The components 7, 8 12 are deposited near the edge of the pallet 4 which is of sufficiently large size to form a relatively big inner space free of bearing arms. The bearing arms 14 are designed as relatively inaccurate single seats and perform merely a supporting and holding function for the components 7, 8 and 12 without precise adjustment. After the transport and the exact centering and chucking of the components in the machining station are concluded, only a few bearing arms 14 are sufficient to merely support the components 7, 8, 12 and hold them so that the total carriers can grip and chuck them. In this process, the components 7, 8 and 12 may also sag in their deposited position or otherwise deform elastically without suffer-damage. As FIG. 2 shows, the pallet 4 initially still has free bearing arms 14 which will later support the finish-machined assembly.

Figure 3:
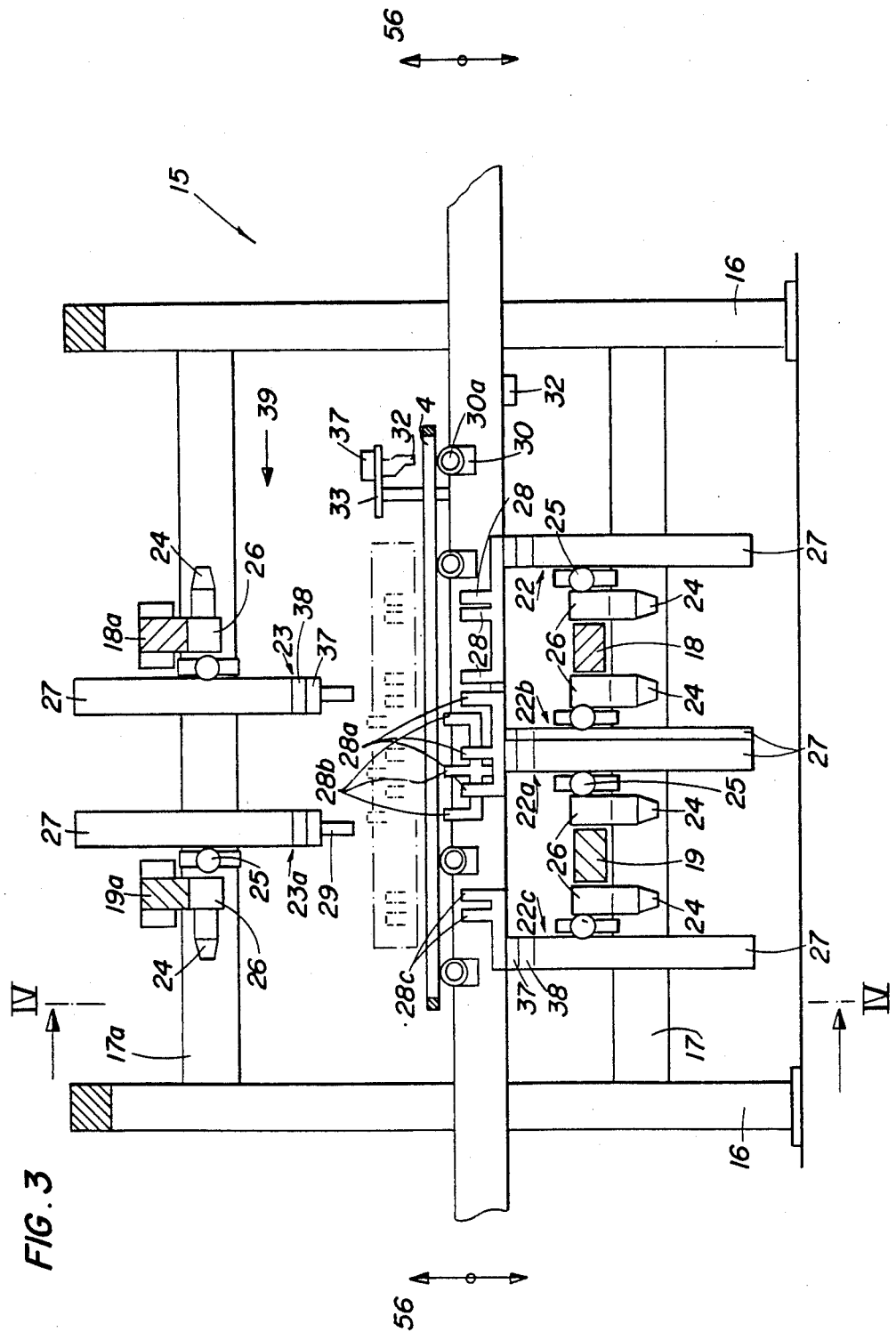
FIG. 3, is a longitudinal sectional view of a machining station.

FIG. 3 shows a machining station in partly broken-off side view. The arrow 39 indicates the transport direction in which the pallets 4 pass through the machining station 3.

Figure 5:
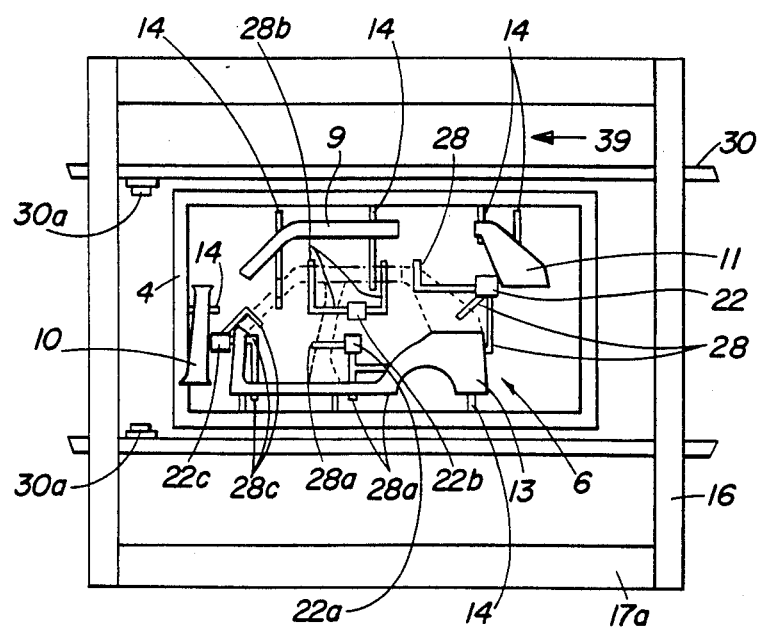
FIG. 5, is a top plan view of a machining station according to FIGS. 3 and 4, with a workpiece carrier and an assembly, in variation of FIG. 2.
Figure 4:
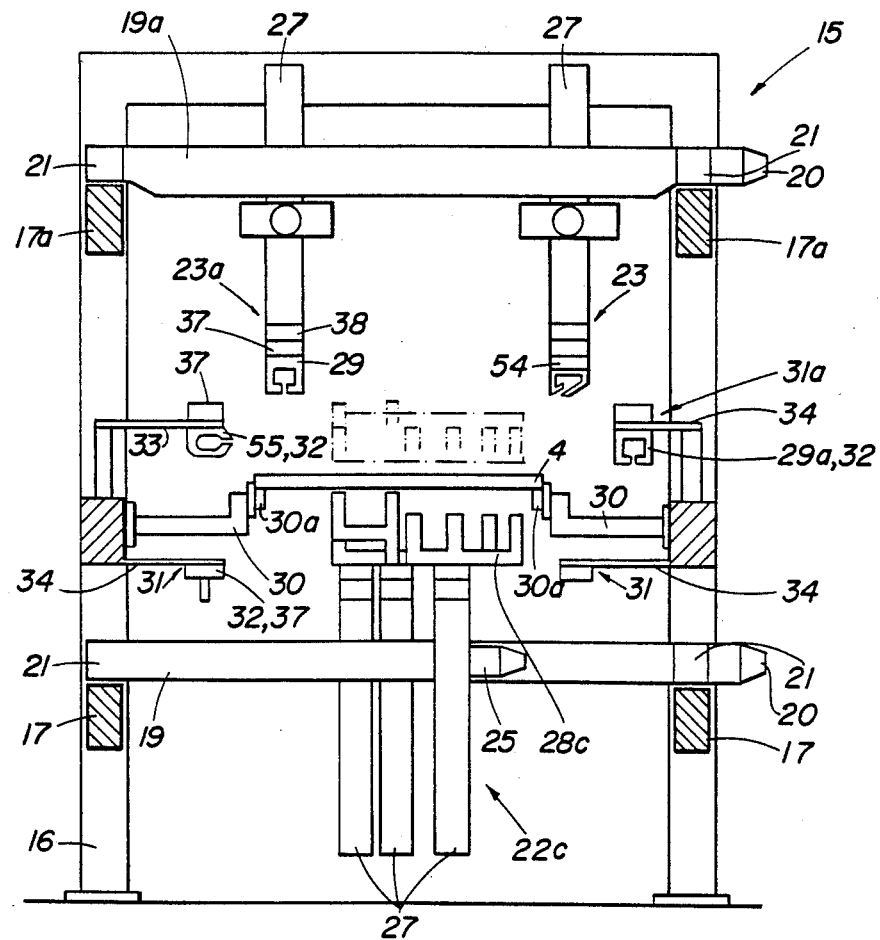
FIG. 4, is a transverse section of a machining station along line IV—IV in FIG. 3.

As is evident from FIGS. 3, 4 and 5, the machining station 3 has a machine frame 15 which consists essentially of four vertical support posts 16, placed to form a rectangle and interconnected in transport direction 39 on both sides of the pallet 4 by a pair of longitudinal beams 17, 17a each. Furthermore, the posts 16 are supported on top by a cross connection forming a portal. The pallets 4 are moved on a runway which interconnects the various stations of the transfer line. Provided for this purpose in the machining station 3 is a pallet track 30 with rolls 30a, extending in longitudinal direction and projecting laterally inward. In addition, centering means (not shown) are provided to fix the pallet in a predetermined position relative to the machining station 3. The drive to move the pallets is not shown either. The rolls 30a may be driven to turn, for instance. The longitudinal beam pairs 17, 17a are mounted so as to be spaced below or above the pallet track 30 and the pallet 4 placed on it. The two lower longitudinal beams 17 constitute the track for two lengthwise movable cross beams 18, 19. On the two upper longitudinal beams 17a two cross beams 18a, 19a are mounted in the same manner so as to be movable lengthwise. The cross beams 18, 19, 18a, 19a each have running gears 21 for guidance on their longitudinal beams 17, 17a and a precise actuator 20. The actuator 20 consists of a displacement controlled electric motor, preferably a step motor or pancake drive, driving its cross beam via a no-backlash toothed belt or rack.

The toothed belt or rack drives used for this purpose are provided with a cover and are the subject of the older, not prepublished, national German Patent Application No. P 34 20 936.0.

Mounted on the cross beams 18 to 19a so as to be movable transverse to the transport direction 39 are tool carriers 22, 22a, 22b, 22c, 23 and 23a. The tool carriers 22 to 22c are movable independent of each other and form a group which can travel in one common, horizontal plane at a distance below and parallel to the main plane of the pallet 4. The upper tool carriers 23, 23a also form a group which can travel in a second horizontal plane of motion at a distance above and parallel to the main plane of the pallet 4.

Mounted on the cross beams 18, 19 and guided on them without play through running gear 26 are two tool carriers each 22 and 22b as well as 22a and 22c on opposite sides. By contrast, only tool carrier 23, 23a each is mounted on the upper cross beams 18a, 19a by means of corresponding running gear 26.

In the embodiment example shown, the cross beams are designed as beams on which the tool carriers are cantilevered. In variation thereof, it is also possible to design the cross beams as two parallel, mutually spaced beams in the form of a bridge and to mount and guide the tool carriers between them on both sides.

The tool carriers 22 to 23a are driven individually without backlash by displacement-controlled actuators 24 in the same manner as the cross beams 18 to 19a.

The tool carriers 22 to 23a are thus freely movable horizontally in two axes below or above the pallet 4 and can be positioned precisely.

In order to be freely movable in space, the tool carriers 22 to 23d have a third, vertical axis of motion of their own. Towards this end, each tool carrier 22 to 23a has a carrier head 27 which is height-adjustable by means of a precise, displacement-controlled actuator 25.

In variation thereof, the third axis of motion for the tool carriers may also be of different design, e.g. by providing a swivel head or a height adjustability of the longitudinal beams 17, 17a.

By means of automatic couplings 37, 38 the tool carriers 22 to 23a carry rechangeable tools 28, 28a, 28b, 28c, 29, 54 or 29a, 32, 55. In the embodiment examples shown, the tools 28 to 28c are designed as centering chucks, each with several individual jaws engaging the components 9, 10, 11, 13 of the assembly 6.

In variation of FIG. 2, FIG. 5 depicts an assembly 6 in the form of a four-door sidewall version of a motor vehicle.

On the other hand, the two upper tool carriers 23, 23a are each equipped with spot welding tongs 29, 29a or with grippers 54 and 55.

Now, the function of the tool carriers 22 to 23a is as follows:

With at least one of the individual jaws of their chucks 28, 28a, 28c the lower tool carriers 22, 22a and 22c lift the bottom part 13 up from the bearing arms 14 of the pallet 4 (see FIG. 3) by a certain, programmed amount. Likewise, the tool carrier 22b with its still empty chuck 28b moves upwardly also. All of the tool carriers 22 to 22c are then in their final working position already.

The gripper 54 of the upper tool carrier 23 fetches the rear roof spar 11 from its location on the pallet 4, brings it into the position shown in broken lines in FIG. 5 opposite the bottom part 13 and places the roof spar 11 next to the bottom part 13 and into the two still empty jaws of the chuck 28. In the same manner, the other upper tool carrier 23a, by means of the gripper 55 exchanged for the welding tons 29 (FIG. 4), places the door spar 10 next to the bottom part 13 and into the still empty individual jaw of the chuck 28a and a free individual jaw of the chuck 28b. Subsequently, the gripper 54 of the tool carrier 23, free again after having deposited the roof spar 11, grips the front roof spar 9 and places it into the still empty individual jaws of the chucks 28b and 28c. When all chucks 28 and 28c are closed, the components 9, 10, 11 and 13 are in the correct position relative to each other and can be welded at the seams. For this purpose, the grippers 54, 55 on the upper tool carriers 23, 23a are exchanged for the welding tons 29, 29a. Thus, the assembly can be finish-welded in the machining station without prior tacking.

After the finish-welding, the chucks open and the tool carriers 22 to 22c including the assembly 6 are lowered until the latter is deposited on its bearing arms 14 on the pallet 4. Then the tool carriers 22 to 22c are lowered further until their tools are out of the range of motion of the pallet 4.

In variation thereof, the pallet 4 may also be lowered by a hoisting device 56 (FIG. 3) relative to the chucks 28 to 28c prepositioned in working position, the bottom part 13 being put over the open chucks 28, 28a, 28c in the process, thereby centering itself. After the welding operation, the pallet 4 is then raised again, taking with it the completed assembly 6.

In the embodiment example shown, the tool carriers 22 to 22c of the lower plane of motion together form a complete centering and chucking bed for the assembly components 9, 10, 11 and 13 to be welded. The tool carriers 23, 23a of the upper plane of motion then assume the transporting and machining tasks.

In other applications, the assignment of functions may be different. For instance, the various tasks may not only be divided according to planes of motion, but may also be assigned to individual tool carriers within the plans of motion.

Figure 7:
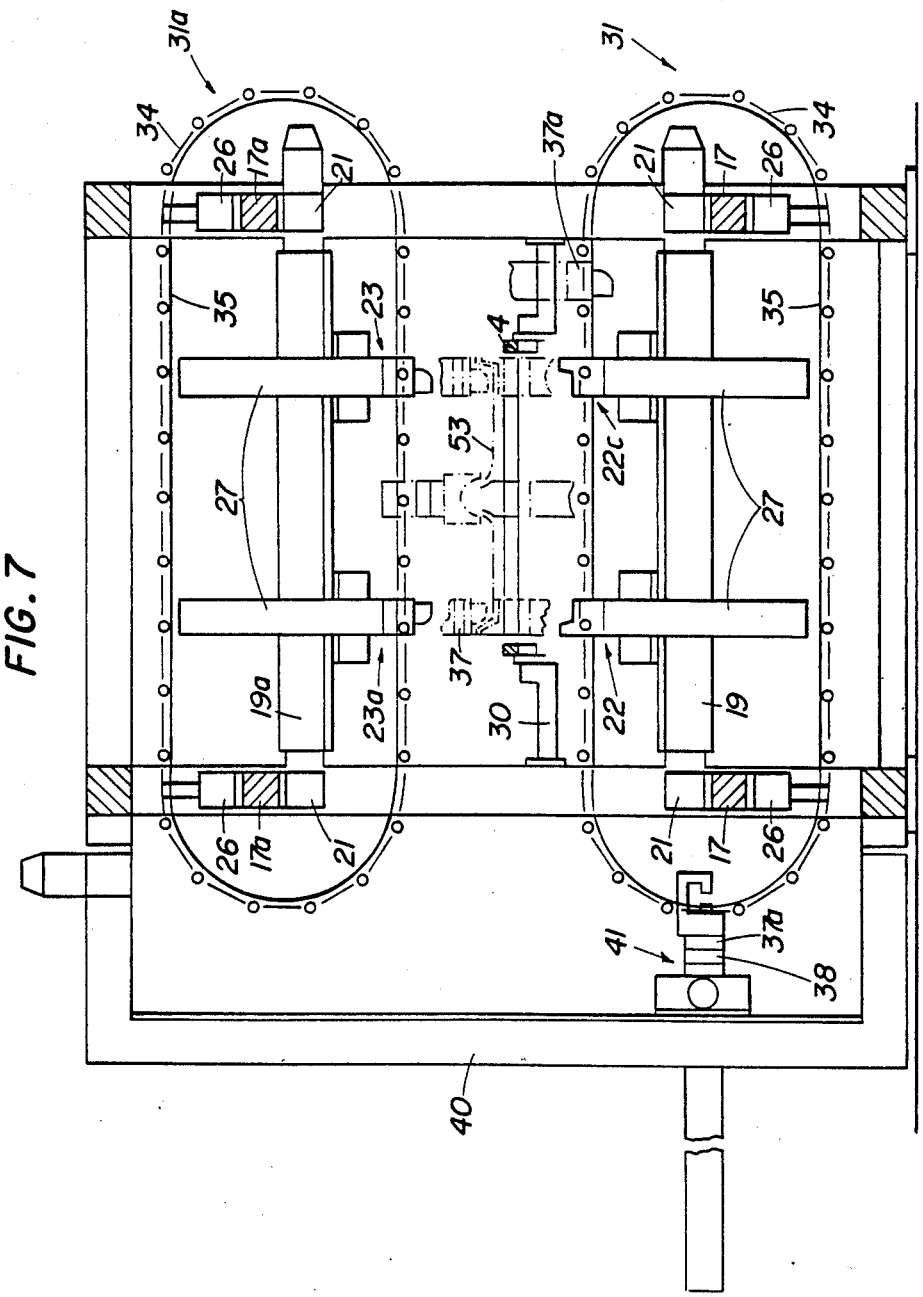
FIG. 7, is a transverse section of a machining station along line VII—VII in FIG. 6.
Figure 9:
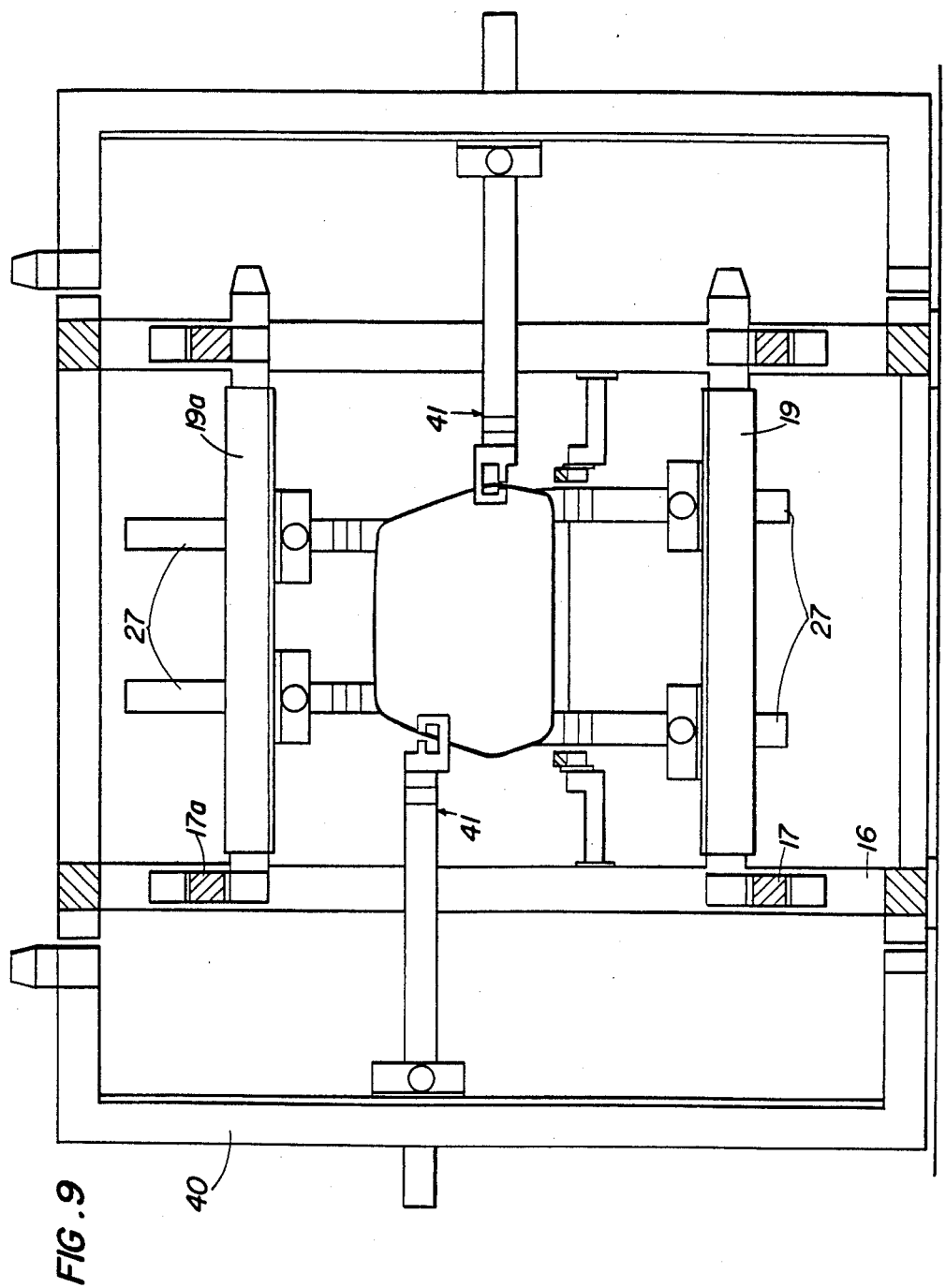

As is evident from FIGS. 7 and 9, a third or even a fourth plane of motion for additional, horizontally aligned tool carriers 41 may be provided for complicated handling and machining tasks. In that case, the tool carriers 41 can travel up and down along one or more vertical beams 40 which are mounted to be movable in longitudinal direction along appropriate longitudinal beams. Such an embodiment is recommended in particular when the assembly components must be moved vertically by a distance longer than the longest possible vertical feed for the horizontally movable tool carriers or when assemblies of laterally high areal extent are involved, such as whole vehicle bodies (FIG. 9). Basically, it is also possible that tool carriers interact in the same or also in different planes of motion, first lifting a part, e.g. for a pivoting motion, and then transferring it to another tool carrier.

The demanded flexibility of the machining station 3 requires in most cases that when there is an assembly change, not only the control program for the tool carrier motion, but also their tools need changing. Towards this end, several tool magazine 31, 31a are provided in the machining station 3. In the embodiment example of FIGS. 3 to 5, an upper tool magazine 31a is assigned to the upper tool carriers 22 to 22c. Each tool magazine 31, 31a consists of a number of tool seats 34 rigidly mounted on top of or under the pallet carrier 30 in longitudinal direction 39. The tool seats 34 project from the side into the machining station 3. To exchange tools, the tool carriers must approach the tool seats 34, deposit the tool no longer needed in a free seat and couple the new tool at another seat. For this purpose, the tool seats 33 project into the path of motion of the tool carriers However, in order not to interfere with the free mobility of the tool carriers, the tool seats 33 may also have swivel arms, by means of which they can be pivoted out of the sphere of motion of the tool carriers.

In contrast thereto, FIGS. 6 and 7 show a variation of the tool magazines 31, 31a. They are here formed by a closed row of tool sets 34 which are movable along a rigid oval track 35 transverse to the transport direction 39. The oval tracks 35, in turn, are mounted on the longitudinal beams 17, 17a so as to be movable in transport direction 39, and they have an open inner area so that they can traverse the tool carriers. In this case, the tool magazines 31, 31a are positioned opposite the tool carriers to longitudinal direction, and the old tools are transferred to the rotating tool seats 34, and new ones are coupled. As may be seen in FIG. 7, if the tool seats 34 are correctly aligned, one tool magazine 31 can equip both the vertically aligned tool carriers 22 and the horizontally aligned tool carriers 41. Moreover, the lower tool magazine 31 can equip the tool carriers 23 of the upper plane if the coupling of the tools 37a points upwardly.

To avoid interference, the distances between the longitudinal beams 17, 17a and the pallet 4 have been selected greater than in the embodiment example of FIGS. 3 to 5. Furthermore, the longitudinal beams 17, 17a have been extended on both sides, thereby offering the tool magazines 31, 31a waiting positions in which they are outside of the pallet 4 and of the operating range of the tool carriers.

In variation of FIGS. 3 to 5, FIGS. 6 and 7 also show a passenger car floor assembly 53 as assembly to be welded which also gets holes depending on type variants The holes are produced by a stamping tool (not shown) to be exchanged.

Figure 8:
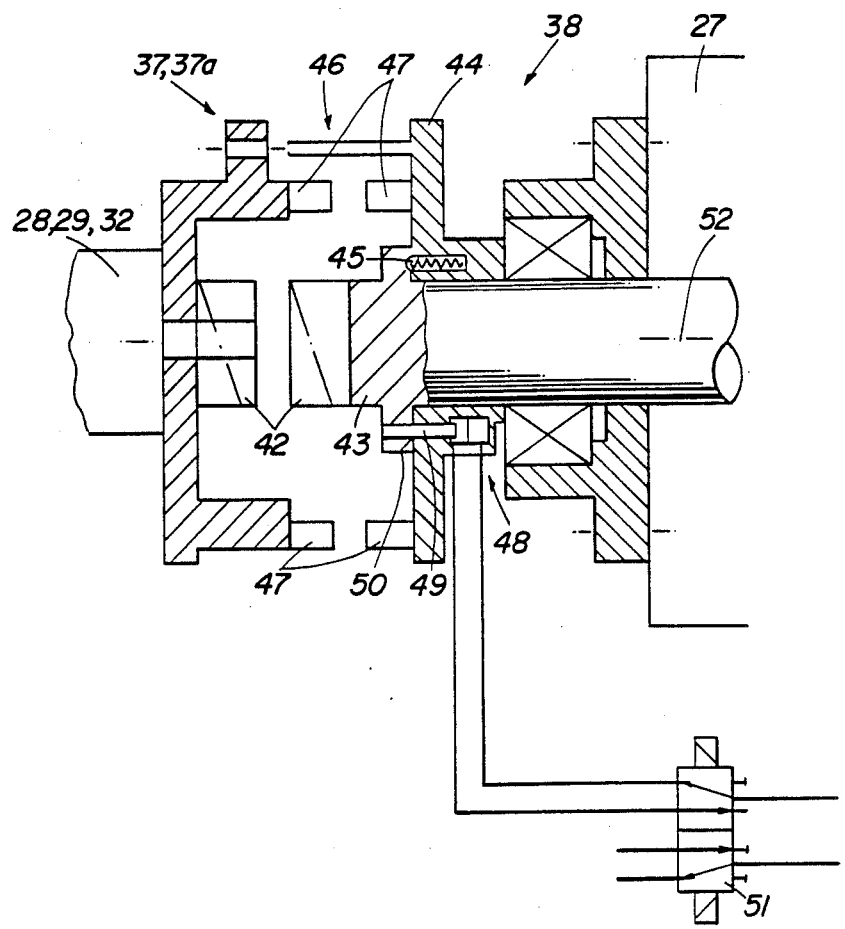
FIG. 8, is a longitudinal section of a coupling disposed between tool and tool carrier; and, FIG. 9, is a transverse section of a machining station in variation of FIG. 4.

FIG. 8 shows an automatic coupling 37, 37a, 38 enabling an automatic exchange of the tools. The carrier head 27 of the tool carriers contains for this purpose a rotary drive not shown, the coupling part 38 corotating with its driven shaft. Opposite it, the coupling part 37 is mounted on the tool 28, 29, 32 secure against rotation. The coupling part 37, 37a, 38 has connections 47 for all operating means of the tool. It is through these connections 47 that control signals and power for the tool are transmitted, which itself may be mobile in additional axes and have corresponding drives. Also welding current and coolant for welding tongs, compressed air or hydraulic fluid for the actuation of chucks or other such operating means are transmitted through the connections 47. The operating means are supplied to the carrier heads 27 via drag lines, wiping contacts or other such elements.

The coupling 37, 37a, 38 is designed as straight plug-in coupling in which the connecting parts 47 are introduced into each other, opening each other up when liquid or gaseous media are being connected. The connections 47 are automatically closed in this case when the coupling is open. The coupling parts 37, 37a, 38 are connected through a threaded bayonet arrangement 42. For coupling, the coupling part 38 is turned into the coupling position, and the carrier head then feeds it to the coupling par 37, 37a to the point where the threaded bayonet arrangement 42 gets into ready position and an antirotation device 46 on the coupling part 38 engages a corresponding hole in the coupling part 37. This assures straight guidance which is needed to plug the connections 47 into each other. Subsequently, the inner part 43 is turned to cause the threaded bayonet arrangement 42 to engage. For this purpose, the inner part 43 is rotatably mounted in an outer part 44 which supports the antirotation device 46 and is connected to the outer part 44 in the initial and final positions of the rotary motion by spring-loaded, unlockable detents 45. The antirotation device 46 prevents the outer part 44 from corotating, in consequence of which the detent 45 will let go when the inner part 43 is turned relative to the stationary outer part 44 and the threaded bayonet arrangement 42 connects the coupling parts 37, 37a and 38 firmly to each other. For uncoupling, the above described process takes plane in reverse order. By means of their couplings 37, the tools are prepositioned in coupling positions in the tool seats 34 and retained secure against rotation.

If there is the danger that, due to greater torsional forces exerted on the tools about the center axis 52, the threaded bayonet arrangement 42 could disengage, and e.g. electropneumatically controlled locking arrangement 48 is provided either alone or additionally. The piston, designed as locking bolt 49, is pulled out of the locking hole 50, or pushed into it for locking, by double-acting solenoids 51 by means of compressed air at the beginning or end of the rotary motion of the inner part 43 in the outer part 44.

While the specific embodiments of the invention have been shown and described in detail to illustrate the application of the principles of the invention, it will be understood that the invention may be embodied otherwise without departing from such principals.

I claim:

1. A method for the automatic joining and machining of different assemblies, each assembly having at least one component contained in a workpiece carrier having a bearing arm, the method using a transfer line with a retoolable and reconfigurable work station, comprising: presorting parts for the assembly and placing presorted parts on the workpiece carrier bearing arms in positions corresponding generally to a pre-arranged assembly position; delivering the assembly parts on the workpiece carrier bearing arms in a loose and unjoined condition to a work station; employing individual holding and clamping implements, associated with one of a plurality of tool carriers movable in at least two dimensions, at the work station to automatically position the assembly parts into a precise predetermined joining position relative to other assembly parts; and, securing the assembly parts in a joining position, and thereafter completing at least one of lifting and welding the secured assembly parts.

2. A method according to claim 1, further cmprising the step of: automatically exchanging individual tools at a work station.

* * * * *